3,810,744
METHOD FOR MAKING FUSED SILICA GLASS COMPOSITES

William H. Dumbaugh, Jr., 6 E. Chatfield Place, and Joseph W. Malmendier, 5 Morningside Drive, both of Painted Post, N.Y. 14870
No Drawing. Filed Aug. 31, 1972, Ser. No. 285,484
Int. Cl. C03c 25/02; B29b 3/00
U.S. Cl. 65—42          3 Claims

ABSTRACT OF THE DISCLOSURE

This invention relates to a method for applying a fused silica-based glass cladding or layer to the surface of glasses, glass-ceramics, ceramics, and organic plastic bodies wherein said silica-based glass is first applied through flame hydrolysis to a temporary foil carrier.

---

Organic plastic materials exhibit certain advantageous properties with respect to glasses such as lighter weight and less brittleness. However, such materials are subject to scratching, are frequently difficult to clean, and are permeable to moisture. A composite of the two types of materials could enable advantage to be taken of the superior qualities of each. For example, the light weight of an organic plastic could be combined with the scratch resistance and easy cleaning of a thin glass coating to form an optical or ophthalmic lens. Also, such a composite could be useful in the container industry where plastics and paper products enjoy a large share of the market. A major disadvantage of those materials is the lack of hermeticity such that food products stored therein will have a limited shelf life. Incorporating a thin layer of glass in a plastic matrix would solve that situation.

It is known that the strength of a glass, glass-ceramic, or ceramic article can be greatly enhanced when the surfaces thereof are placed in compression. Means for accomplishing that purpose are many. One of the oldest methods developed therefor and which is still employed widely today is thermal tempering of glass which involves briefly heating the article to a temperature at about the softening point of the glass and then very rapidly chilling the article to a temperature below the strain point of the glass. A rather recent development, which has been variously called chemical strengthening or chemical tempering, employs an ion exchange reaction occurring within the surface of the glass or glass-ceramic article. In general, large diameter monovalent metal ions from an external source, normally a bath of a molten salt of the proper ions, are exchanged with smaller diameter monovalent metal ions in the glass or glass-ceramic surface. A still more recent method has involved that hot glass forming of laminated articles such that the interfaces between the glass and/or glass-ceramic laminae are essentially defect-free wherein the surface layer has a lower coefficient of thermal expansion than the interior such that, upon cooling to room temperature, the surface layer is in a state of compression.

The present invention, involving the formation of a thin sheet or layer of fused silica or silica-based glass which exhibits a very low coefficient of thermal expansion, can lead to the development of a surface compression layer on glass, glass-ceramic, or ceramic articles. Furthermore, inasmuch as fused silica is more chemically durable than most glasses, the resistance to corrosion of such a composite will frequently be superior to the original core glass.

The expression "fused silica glass" is used throughout the present specification and claims to designate a glass composed primarily of silica ($SiO_2$) and prepared by the flame hydrolysis technique. This method of glass formation, and numerous specific embodiments thereof, are described in detail in such U.S. patents as Pat. No. 2,239,551, granted Apr. 22, 1941 to R. H. Dalton et al., Pat. No. 2,272,342, granted Feb. 10, 1942 to J. F. Hyde, and Pat. No. 2,326,059, granted Aug. 3, 1943 to M. E. Nordberg. Also of interest in this regard is pending U.S. application Ser. No. 208,168, filed Dec. 15, 1971 in the names of P. C. Schultz and F. W. Voorhees.

In general, the method comprises supplying in vapor form, a hydrolyzable compound of silicon, alone or in admixture with a small amount of a hydrolyzable compound of another element which will combine with or enter into the silica structure. The vapors are passed into a flame of combustible gas in a burner where they are hydrolyzed and thermally decomposed to form oxides. Depending upon the temperature of the site of deposit, the oxides formed (primarily silica) may be laid down directly as an integral glass or, alternatively, may be deposited on a mandrel or other form as a dense, finely-divided amorphous powder (known as soot) which is subsequently consolidated through heat treatment.

The choice of secondary oxides is very wide. For example, Pat. No. 2,326,059, supra, describes additions of $Al_2O_3$ and $TiO_2$ and U.S. Pat. No. 3,659,915 discloses fused silica doped with oxides of titanium, tantalum, tin, niobium, zirconium, ytterbium, lanthanum, and aluminum up to 15% by weight. Application Ser. No. 208,168, supra, discusses the addition to fused silica of the oxides of aluminum, tantalum, niobium, molybdenum, zirconium, beryllium, tungsten, and iron. In reality, any metal oxide can be employed as a dopant which can be applied in the form of a hydrolyzable compound suitable for use in the flame hydrolysis process. Hence, oxides of boron, germanium, and the other transition elements are immediate examples.

In broad outline, the present invention comprises two general steps. First, a layer of fused silica glass or a combination of silica plus one or more secondary metal oxides ($M_xO_y$) is deposited upon a thin sheet or foil of a metal which is unreactive with the glass and capable of withstanding temperatures of 1400°–1750° C. Commonly, platinum foil is utilized for this purpose although other high melting temperature metals such as molybdenum and tungsten can be used where a proper reducing atmosphere can be controlled. Second, the glass-coated metal sheet or foil is placed in contact with a glass, glass-ceramic, ceramic, or plastic material and the glass transferred thereto from the metal.

In the preferred practice of the invention, the fused silica or $SiO_2+M_xO_y$ is first deposited upon the metal sheet or foil as an amorphous soot at temperatures of about 1400°–1600° C. which is subsequently consolidated to a clear glass layer by firing at 1000°–1600° C. That practice permits better control of glass layer thickness on the metal. Thereafter, the glass layer can be transferred from the metal sheet or foil.

In producing the films and sheets of the present invention, a suitably proportioned mixture of vapors of hydrolyzable compounds of silicon and, optionally, a secondary metal oxide is entrained in a carrier gas. Normally, a gas not involved in the hydrolysis process is employed as the carrier gas. Nitrogen and oxygen are especially suitable but any gas which will not react with the compound being vaporized can be utilized. The carrier gas must be dry to preclude premature hydrolysis of the vapors with consequent clogging of the delivery system. The vapor mixture is passed through a burner to hydrolyze the vapors and convert them into the corresponding oxides by flame hydrolysis. The temperature of deposition is maintained such that the oxides are deposited as soot.

As observed above, any hydrolyzable compound of silicon and, optionally a secondary metal can be employed.

Where the compounds are compatible in mixture and have suitable vapor pressures, a liquid mixture may be used. Otherwise, the compounds can be vaporized separately and the vapors combined in desired proportions. Where required, the vapor delivery system will be heated externally to avoid condensation.

Metal halides, particularly chlorides, are commonly utilized as the hydrolyzable compounds since these are usually the least expensive and most readily available. Furthermore, they are convenient to use and produce byproducts which are relatively easy to control. Nevertheless, any other vaporizable and hydrolyzable compound can be substituted therefor as, for example, organometallic compounds. Although liquid compounds are generally easier to work with, solid powders such as are described in application Ser. No. 208,168, supra, can also be employed effectively.

In some instances, a separate vapor stream, e.g., a carrier gas containing a silicon halide vapor, can be used as the pick up gas stream that is passed through the liquid or powder secondary metal compound. However, condensation problems, as well as proportion control problems, normally make this impractical. It is also possible to employ a stream of the combustible gas used in the burner as the carrier gas. That practice can lead to premature oxide deposition at the burner tip with consequent clogging so is normally avoided. An oxygas burner is preferably used for the flame hydrolysis with either oxygen or natural gas as the carrier gas.

In general, the upper limit on the amount of secondary metal oxide that can be added is that amount which can be incorporated in the silica base glass before crystallization occurs. Crystallization results in the glass adopting a hazy, rather than a clearly transparent appearance, and, where large crystals are developed, can lead to cracking and breakage. In view of this factor, an upper limit of 25% by weight has been deemed practical for all additions of secondary oxides.

The application of the glass cladding or layer to the plastic, glass, glass-ceramic, or ceramic body contemplates three basic steps. First, the fused silica-based glass deposited upon the metal foil is brought into contact with the substrate material. Second, the substrate material is bonded to the fused silica-based glass. Third, the metal foil is removed.

Where the substrate material comprises a glass, glass-ceramic, or ceramic body, the second step of bonding commonly involves heating the laminated structure to a temperature at which either the substrate material or the fused silica-based glass becomes sufficiently softened to cause wetting at the interface with resultant bonding to each other. Hence, with most glass substrates, the temperature will be raised to about the softening point thereof such that the glass will wet the fused silica-based glass deposit on the metal foil. However, with a glass-ceramic or ceramic substrate, it may be necessary to heat the laminated structure to a temperature approaching the softening point of the fused silica-based glass on the metal sheet. In either instance, after the laminated structure has been cooled to room temperature, the metal foil can easily be peeled away from the composite body.

The manner of production and the inherent nature of organic plastic materials permit the second step of bonding to be undertaken in several ways. For example, a plastic in a liquid or wet gel form can be placed in contact with the fused silica-based glass and allowed to cure in air or with light heating. Upon hardening, the plastic will bond to the glass and the metal foil removed thereafter. Hence, an aqueous solution of polyvinyl alcohol or a solution of polyethylene in methyl ethyl ketone are illustrative of that practice. In another mode, a preformed shape of an organic plastic can be exposed to a solvent therefor and then immediately placed into contact with the fused silica-based glass. The tacky surface of the plastic will adhere thereto and provide a tight bond with the glass upon drying. A preformed body of acetyl cellulose or of polyvinyl butyral utilizing acetone as the solvent are illustrative of that practice. In yet another mode, a plastic body can be bonded to the fused silica-based glass by means of adhesives or adhesion promoters. Epoxy resins and polyvinyl acetate are representative of the former and vinyl triethoxy silane and titanium isopropoxide are illustrative of the latter. Finally, a preformed shape of an organic plastic can be thermally bonded to the fused silica-based glass. For example, polyethylene and polypropylene can be heated to 100°–300° C. to initiate flow with consequent bonding upon cooling to room temperature.

The two principal functions of the metal sheet or foil are to provide support for the laminated structure during the firing step so as to prevent distortion thereof and to enable the production of very thin layers of glass which could not otherwise be handled without breakage.

Table I below reports the composition of several fused silica-based glasses, as calculated in weight percent on the oxide basis, which can be utilized in the present invention. A glass conforming to each of the compositions can be produced from a suitable mixture of the corresponding chloride vapors, the proportions of the mixture being calculated on the basis of the oxide composition desired. The respective chloride vapors can be entrained in a stream of carrier gas, specifically oxygen, and passed through a high temperature oxygas burner. This produces, by flame hydrolysis in accordance with the preferred embodiment of this invention, a soot which is directed upon a strip of platinum foil. After a layer of suitable depth has been deposited, e.g., 0.5 to 5 mils, the coated foil is heated to 1000°–1600° C. to consolidate the soot to a vitreous layer. Usually, heating times varying between about 10–60 minutes will be adequate for that purpose. It will be appreciated that thicker layers of glass can be produced in this manner, but for the applications specifically envisioned, thin layers are to be preferred.

TABLE I

| Percent: | 1 | 2 | 3 | 4 | 5 | 6 | 7 | 8 |
|---|---|---|---|---|---|---|---|---|
| SiO$_2$ | 100 | 85 | 90 | 85 | 92 | 96 | 90.4 | 95 |
| B$_2$O$_3$ | | 15 | | | | | | |
| Al$_2$O$_3$ | | | 10 | | | | | |
| TiO$_2$ | | | | 15 | | | 6.0 | |
| Ta$_2$O$_5$ | | | | | 8 | | 3.6 | |
| Nb$_2$O$_5$ | | | | | | 4 | | |
| ZrO$_2$ | | | | | | | | 5 |

Table II records the compositions of several glasses in weight percent on the oxide basis which, in the form of plates about 2″ x ½″ x ⅛″, can be employed as substrate materials. The coefficient of thermal expansion (25°–300°C.) and the softening point is also recited. In each instance, the coated platinum foil is placed on opposite sides of the plate with the glass coating in contact with the plate. This laminated structure is then heated to a temperature approaching the softening point of the glass plate and the temperature held thereat for a sufficient length of time to assure adequate glass flow to wet the fused silica glass coating on the platinum foil, normally between about 10–60 minutes. Upon cooling to room temperature, the foil could be readily removed leaving the fused silica-based glass firmly sealed to the substrate.

TABLE II

| | A | B | C | D |
|---|---|---|---|---|
| Percent: | | | | |
| SiO$_2$ | 58.0 | 35.0 | 66.0 | 40.0 |
| Al$_2$O$_3$ | 15.0 | 6.0 | 23.0 | |
| CaO | 10.0 | | 11.0 | |
| MgO | 7.0 | | | |
| BaO | 6.0 | 41.5 | | |
| B$_2$O$_3$ | 4.0 | 10.0 | | |
| ZnO | | 6.0 | | |
| TiO$_2$ | | 1.5 | | |
| PbO | | | | 50.0 |
| K$_2$O | | | | 6.3 |
| Na$_2$O | | | | 2.7 |
| Li$_2$O | | | | 1.0 |
| Softening point, °C | 910 | 1,060 | 755 | 525 |
| Expansion coefficient (x10$^{-7}$/°C.) | 46 | 71 | 35 | 102.4 |

Inasmuch as alkali metal ions tend to initiate devitrification in the silica-based surface layer, it is preferred that the substrate glass be free therefrom although transparent surface coatings could be applied to Example D. Furthermore, since the surface cladding is of such a thin depth, a wide disparity in the coefficient of thermal expansion thereof and that of the substrate glass body can be tolerated. The coefficient of thermal expansion (25°–300° C.) of fused silica is about $5 \times 10^{-7}/°$ C. and that of $SiO_2$-$TiO_2$ combinations can approach zero. Therefore, it is quite apparent that claddings of such glasses would result in surface layers on the glass bodies of Table II under extremely high compressive stress.

This technique is also effective in cladding a glass-ceramic article in order to improve the strength, chemical durability stain resistance, or some other property thereof. Thus, for instance, a layer of fused silica glass (Example 1) can be deposited on two pieces of platinum foil in the manner described above. Thereafter, the coated platinum foil is placed on opposite sides of a plate of a thermally crystallizable glass having the approximate composition reported below with the fused silica glass coating in contact with the plate. The composition of the thermally crystallizable glass which, when crystallized in situ to a glass-ceramic, is distributed by Corning Glass Works as Code 9608 is listed in weight percent:

|  | Percent |
|---|---|
| $SiO_2$ | 69.60 |
| $Na_2O$ | 0.43 |
| $K_2O$ | 0.11 |
| $Li_2O$ | 2.72 |
| $Al_2O_3$ | 17.90 |
| $TiO_2$ | 4.70 |
| $As_2O_3$ | 0.72 |
| MgO | 2.65 |
| ZnO | 0.92 |
| $ZrO_2$ | 0.25 |

The laminated structure is then subjected to the following heat treatment in an electrically-fired furnace to convert the glass to a glass-ceramic:

Rapid heating from room temperature to 500° C.
Heat at about 5° C./minute to 800° C.
Hold at 800° C. for one hour
Heat at about 4° C./minute to 1070° C.
Heat at about 0.3° C./minute to 1150° C.

Cut off electric current and allow furnace to cool to room temperature with laminated structure inside.

Upon removal of the composite body from the furnace, the platinum foil could be readily removed therefrom leaving the fused silica glass firmly sealed to the glass-ceramic substrate, the coefficient of thermal expansion of which is about $13 \times 10^{-7}/°$ C.

We claim:
1. A method for applying a transparent fused silica-based glass layer to a glass, glass-ceramic, ceramic, or organic plastic substrate body comprising the steps of:
  (a) applying through flame hydrolysis a layer of fused silica-based glass consisting essentially, by weight on the oxide basis, of 75–100% $SiO_2$ and 0–25% $M_xO_y$, wherein said $M_xO_y$ consists of $TiO_2$, $Ta_2O_5$, $SnO_2$, $Nb_2O_5$, $ZrO_2$ $Yb_2O_3$, $WO_3$, $MoO_3$, BeO, $La_2O_3$, $Al_2O_3$, $GeO_2$, or $B_2O_3$, and mixtures thereof, to a surface of a thin sheet or foil of a metal which is inert to said glass and is capable of withstanding temperatures up to 1750° C.;
  (b) contacting a surface of a glass, glass-ceramic, ceramic, or organic plastic substrate body with the fused silica-based glass surface of the glass-metal laminant;
  (c) bonding said substrate body to said fused silica-based glass by heating said laminant and substrate body to a temperature about the flow point or softening of said fused silica-based glass or of said substrate body; and
  (d) cooling the resulting laminated structure to room temperature and removing said metal sheet or foil.

2. A method according to claim 1 wherein said layer of fused silica-based glass is applied directly on said metal as an integral glass through flame hyrolysis conducted at about 1400–1750° C.

3. A method according to claim 1 wherein said fused silica-based glass layer is applied to said metal by depositing, through flame hydrolysis conducted at about 1400°–1600° C., dense, finely-divided amorphous powder thereon and then consolidating the powder to an integral glass at about 1000°–1600° C.

References Cited
UNITED STATES PATENTS

| | | | |
|---|---|---|---|
| 2,502,758 | 4/1950 | Short | 156—246 X |
| 3,666,578 | 5/1972 | Chadsey et al. | 156—246 X |
| 2,424,353 | 7/1947 | Essig | 65—60 X |
| 2,326,059 | 8/1943 | Nordenberg | 65—18 X |
| 3,249,466 | 5/1966 | Lushet | 65—18 X |
| 3,434,817 | 3/1969 | Hazadra et al. | 65—60 |
| 3,620,872 | 11/1971 | Backwell | 156—246 X |
| 3,580,771 | 5/1971 | Maffitt | 156—246 X |
| 2,448,511 | 9/1948 | Barnes et al. | 65—60 X |

ROBERT L. LINDSAY, Jr., Primary Examiner

K. M. SCHOR, Assistant Examiner

U.S. Cl. X.R.

65—60; 156—246

UNITED STATES PATENT OFFICE
CERTIFICATE OF CORRECTION

Patent No. 3,810,744    Dated May 14, 1974

Inventor(s) William H. Dumbaugh, Jr. and Joseph W. Malmendier

It is certified that error appears in the above-identified patent and that said Letters Patent are hereby corrected as shown below:

Column 1, line 6, insert "assignors to Corning Glass Works, Corning, N.Y.".

Signed and sealed this 5th day of November 1974.

(SEAL)
Attest:

McCOY M. GIBSON JR.
Attesting Officer

C. MARSHALL DANN
Commissioner of Patents